(12) United States Patent
Williams et al.

(10) Patent No.: US 7,899,235 B1
(45) Date of Patent: Mar. 1, 2011

(54) IMAGE EXCHANGE SEND NON-BOFD IDENTIFICATION

(75) Inventors: Geoffrey R Williams, Mansfield, TX (US); Ronald Hollander, Walnut Creek, CA (US); Carrie Finch, Huntersville, NC (US); Kerry Cantley, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 956 days.

(21) Appl. No.: 11/750,489

(22) Filed: May 18, 2007

(51) Int. Cl.
*G06K 9/00* (2006.01)
*G06F 21/00* (2006.01)

(52) U.S. Cl. .......................... 382/139; 382/305; 705/53

(58) Field of Classification Search ................ 382/112, 382/113, 115, 116, 135, 137, 138, 139, 140, 382/155, 168, 181, 182, 187, 190–203, 232, 382/260, 274, 276, 287, 294, 295, 305, 312, 382/320; 400/578; 705/42, 45, 53; 235/379
See application file for complete search history.

(56) References Cited

U.S. PATENT DOCUMENTS

| | | | | |
|---|---|---|---|---|
| 4,027,142 | A * | 5/1977 | Paup et al. | 235/379 |
| 7,066,669 | B2 * | 6/2006 | Lugg | 400/578 |
| 7,386,511 | B2 * | 6/2008 | Buchanan et al. | 705/45 |
| 2005/0021466 | A1 * | 1/2005 | Buchanan et al. | 705/42 |
| 2006/0229987 | A1 * | 10/2006 | Leekley | 705/45 |

OTHER PUBLICATIONS

International Search Report and Written Opinion for PCT/US08/64120 dated Dec. 1, 2008.
International Preliminary Report on Patentability for PCT/US08/64120, mailed Dec. 3, 2009.
Power Point Presentation, Image Replacement Documents, by Susan Goold, Oct. 3, 2003, 23 pages.

* cited by examiner

*Primary Examiner*—Seyed Azarian
(74) *Attorney, Agent, or Firm*—Banner & Witcoff, Ltd.

(57) ABSTRACT

Aspects of the present disclosure are directed to a method that includes receiving a plurality of paper financial items, scanning each of the paper financial items, and for each paper financial item, generating a plurality of data sets based on the scanning. For each data set, it may be determined whether the associated paper financial item is a bank of first deposit (BOFD) item or a non-BOFD item. Also, for each data set, the data set may be modified depending upon whether the associated paper financial item is determined to be a BOFD item or a non-BOFD item. Further aspects are directed to systems that perform the above method.

19 Claims, 2 Drawing Sheets

IMAGE EXCHANGE SEND NON-BOFD IDENTIFICATION

BACKGROUND

In 2003, the Check Clearing for the 21st Century Act was passed, requiring every bank to accept substitute checks, or image replacement documents (IRDs), which are electronic digital copies of paper checks. Accordingly, banks and other financial institutions are increasingly handling electronic financial items such as substitute checks. Standards for storing, sending, and receiving these electronic financial items have been developed and are presently being used throughout the financial industry.

For instance, the well-known Image Exchange Send standard defines requirements for electronic financial item information format, content, and transfer protocol. One of these requirements is that the sending financial institution must include an electronic endorsement record for each electronic financial item. When the sending financial institution is the true bank of first deposit (BOFD) the sending financial institution is supposed to include in the endorsement record a 26 Record (BOFD Endorsement Record). Where the sending financial institution is not the BOFD, such as for correspondent cash letter items, the sending financial institution is supposed include in the endorsement record a 28 Record (Subsequent Endorsement Record). Thus, financial institutions are required to include either a BOFD Endorsement Record or a Subsequent Endorsement Record for transmit items captured as paper and distributed under Image Exchange Send.

However, in practice it has been difficult to track BOFD items versus non-BOFD items and to apply the appropriate endorsement records. Due to the complexity of multi-tiered correspondent cash letter relationships, there has so far been no clear and consistent systematic or automated solution for accurately determining the true BOFD on correspondent paper capture items. Accordingly, some financial institutions have opted to initially include a BOFD Endorsement Record on all Image Exchange Send eligible items, regardless of BOFD status, and to take on or pass through non-BOFD return items. While the impact of this stop-gap measure has not yet been excessive, it is not expected to be feasible as electronic financial items become the norm. There has thus been a growing need by banks and other institutions that handle electronic financial items for a way to address these difficulties.

SUMMARY

It has been determined that a safe and efficient way to address this issue may be to recognize non-BOFD paper items and include only Subsequent Endorsement Records on Image Exchange Send eligible non-BOFD transit items. There are bank standard processes for capturing both BOFD and non-BOFD paper resulting in item level data set records that can systematically be interrogated, ultimately providing a solution for flagging non-BOFD items so that the appropriate Subsequent Endorsement Record can be applied to those items that are eligible for Image Exchange Send.

Accordingly, aspects of the present disclosure are directed to methods, systems, and computer-executable instructions that may provide a way to at least semi-automate Endorsement Records for Image Exchange Send. For example, some aspects are directed to a method that includes receiving a plurality of paper financial items, scanning each of the paper financial items, and for each paper financial item, generating a plurality of data sets based on the scanning For each data set, it may be determined whether the associated paper financial item is a bank of first deposit (BOFD) item or a non-BOFD item. Also, for each data set, the data set may be modified depending upon whether the associated paper financial item is determined to be a BOFD item or a non-BOFD item.

These and other aspects of the disclosure will be apparent upon consideration of the following detailed description of illustrative aspects.

BRIEF DESCRIPTION OF THE DRAWINGS

A more complete understanding of the present disclosure may be acquired by referring to the following description in consideration of the accompanying drawings, in which like reference numbers indicate like features, and wherein.

It is noted that the various drawings are not necessarily to scale.

DETAILED DESCRIPTION

The various aspects summarized previously may be embodied in various forms. The following description shows by way of illustration various examples in which the aspects may be practiced. It is understood that other examples may be utilized, and that structural and functional modifications may be made, without departing from the scope of the present disclosure.

Except where explicitly stated otherwise, all references herein to two or more elements being "coupled" to each other is intended to broadly include both (a) the elements being directly connected to each other, or otherwise in direct communication with each other, without any intervening elements, as well as (b) the elements being indirectly connected to each other, or otherwise in indirect communication with each other, with one or more intervening elements.

As previously discussed, it may be desirable to recognize non-BOFD paper items and include Subsequent Endorsement Record with Image Exchange Send eligible non-BOFD transit items. There are bank standard processes for capturing both BOFD and non-BOFD paper resulting in item-level data set records that may be systematically interrogated, ultimately providing a solution for flagging non-BOFD items so that the appropriate endorsement records may be applied to those items that are eligible for Image Exchange Send.

An illustrative overview for properly identifying and endorsing both BOFD and non-BOFD paper capture items is generally as follows. First, non-BOFD versus BOFD paper financial items may be identified at the point of capture into electronic form, such as substitute checks. Next, the capture data records for endorsement position and/or BOFD arrows may be interrogated at the item level. Non-BOFD items may be distinguished from BOFD items. For instance, non-BOFD items may be flagged. Later in the process, the previously identified non-BOFD items may be recognized at the item level and be associated with a Subsequent Endorsement Record for those non-BOFD items that are to be transmitted per Image Exchange Send. By default, a BOFD Endorsement Record may be applied to all items not identified as non-BOFD items. This process will be described in greater detail with reference to FIGS. 1-3.

Figure 1:
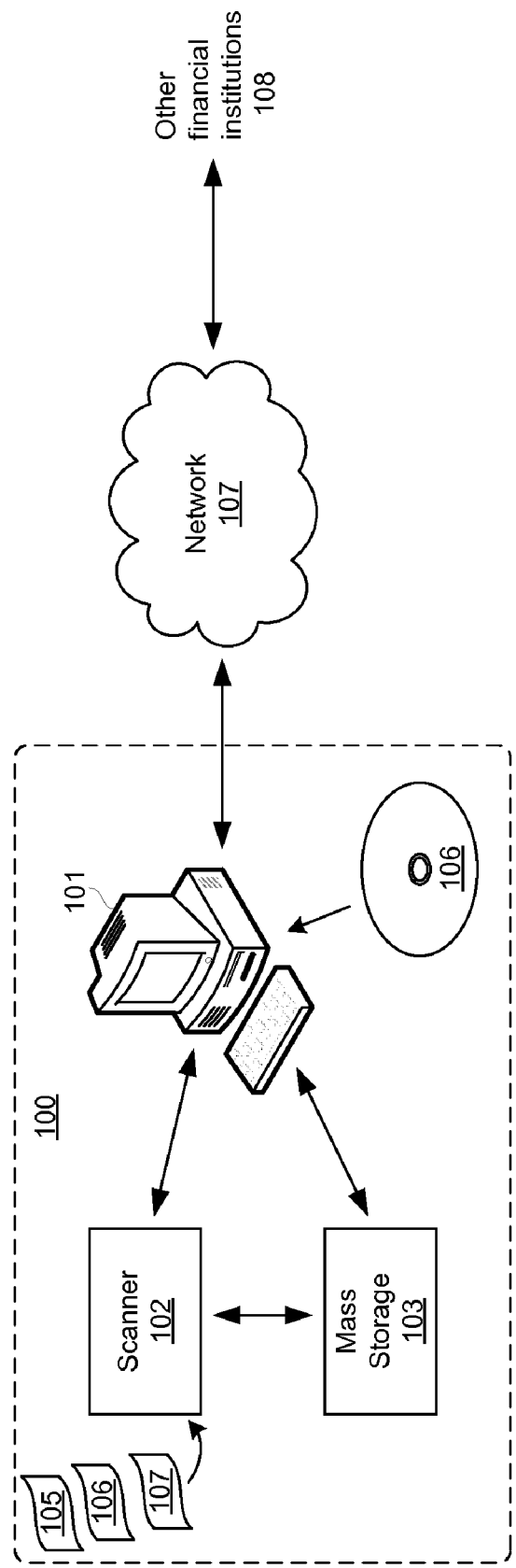
FIG. 1 is an illustrative functional block diagram of a system for handling and sending electronic financial items.

Referring to FIG. 1, an illustrative system 100 is shown in functional block diagram form. System 100 may be physically located at a single location, such as within a single building of a bank or other financial institution, or distributed among multiple locations. System 100 as shown includes a controller 101 coupled to a scanner 102 and mass storage 103.

Although controller 101 is shown in FIG. 1 as a personal computer, controller 101 may be embodied as any one or more computers directly or indirectly coupled together, such as one or more personal computers, mainframes, and/or servers. Controller 101 may be programmable to execute computer-executable instructions (e.g., software). These computer-executable instructions may be stored and accessible to controller 101 on one or more computer-readable media, such as mass storage 103 and/or another computer-readable medium such as a magnetic and/or optical disk 106 (e.g., a CD or hard drive). By executing the computer-executable instructions, controller 101 may perform the various functions described herein.

Scanner 102 may include one or more units of equipment. For instance, scanner 102 may include one or more units of scanning equipment that physically handles, sorts, and/or scans paper financial items (e.g., paper financial items 105, 106, 107), as well as one or more computers for controlling the scanning equipment and/or for processing data generated from the scanning equipment. An example of scanning equipment that may be included as part of scanner 102 is an IBM model 3890 series high speed document processor. Depending upon the document processor used, the scanning equipment may optically and/or magnetically scan, or read, information printed on each paper financial item provided to it. For instance, the scanning equipment may use magnetic ink character recognition (MICR) to recognize characters printed in special fonts with magnetic ink on paper checks, such as the popular E-13B MICR font. The scanning equipment may further optically scan the entire paper document to obtain an optical image of one or both sides of the paper document.

Scanner 102 may further generate data representing the results of scanning the paper documents. For instance, scanner 102 may generate data representing the MICR characters and/or data representing the images of the paper documents. This data may be stored locally by scanner 102 and/or sent to mass storage 103 for storage.

Mass storage 103 may include any one or more computer-readable media for storing data and/or computer-executable instructions. Such computer-readable media may include, for example, one or more magnetic disk drives, optical disk drives, and/or tape drives, and may be configured to store a large amount of data, on the order of gigabytes, terabytes, or more. Mass storage 103 may be used to store, for instance, data received from scanner 102 and/or controller 101 representing or otherwise associated with the scanning of the paper financial items. In addition, mass storage 103 may include one or more computers for implementing a database that relates various portions of the data stored in mass storage 103 with other portions of the data stored in mass storage 103. Alternatively, the database may be implemented by controller 101. In either case, controller 101 may generate and/or receive a query that is processed by the database to selectively return data from mass storage 103 responsive to the query. This data may include one or more data sets associated with financial items.

System 100 as shown is coupled to one or more other financial institutions 108 via a network 107. This allows system 100 to send and/or receive information regarding electronic financial items to and/or from the other financial institutions 108. Network 107 may consist of only a single network or may include a plurality of inter-operating networks. For example, network 107 may include, but is not limited to, one or more of the following types of networks: a wired network, a wireless network, the Internet, an intranet, a telephone network, a satellite network, a wide area network (WAN), and/or a local area network (LAN).

Figure 2:
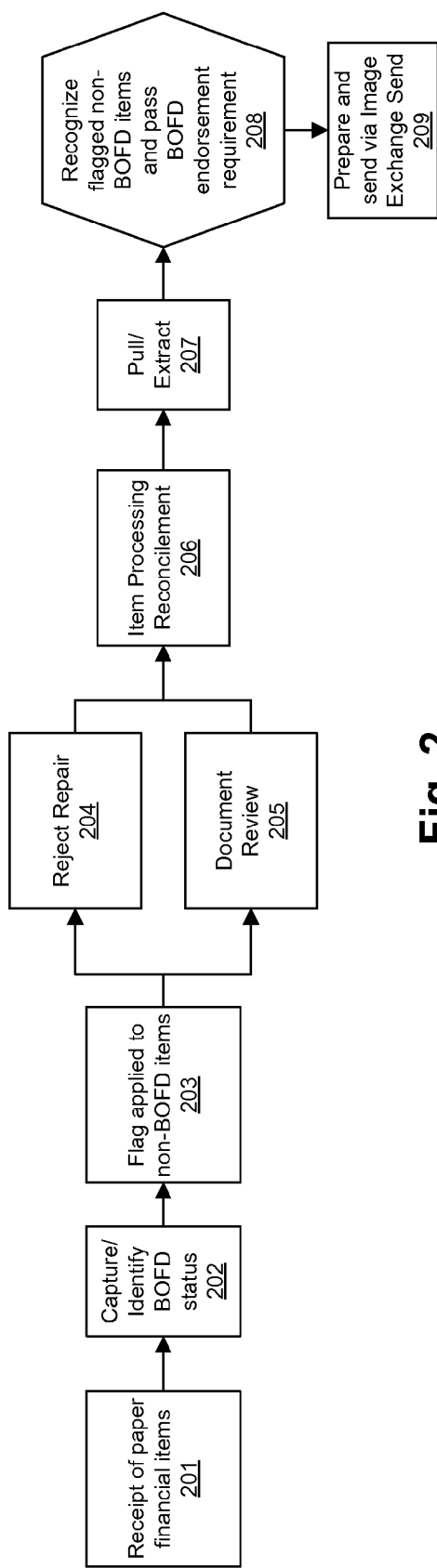
FIG. 2 is an illustrative flow chart showing steps that may be performed by the system of FIG. 1.

FIG. 2 is an illustrative flow chart showing steps that may be performed by system 100 for processing and transmitting information regarding financial items. Although various steps are shown as separate steps in FIG. 2, these steps may be combined and/or further sub-divided in any manner desired. Also, the order of the steps may be rearranged as desired, and steps may even be skipped altogether.

In step 201, scanner 102 receives and/or sorts through a plurality of paper financial items 105-107, such as paper checks, paper cash letters, paper drafts, and the like. Next, in step 202, the paper financial items are electronically captured, or scanned, to generate data representing each paper financial item. For each paper financial item, a data set may be generated that includes, for instance, MICR codeline data read from the magnetic ink printed on the paper financial item, one or more optical images of the paper financial item (e.g., one or both sides of the piece of paper), and/or other information regarding the paper financial item.

Figure 3:
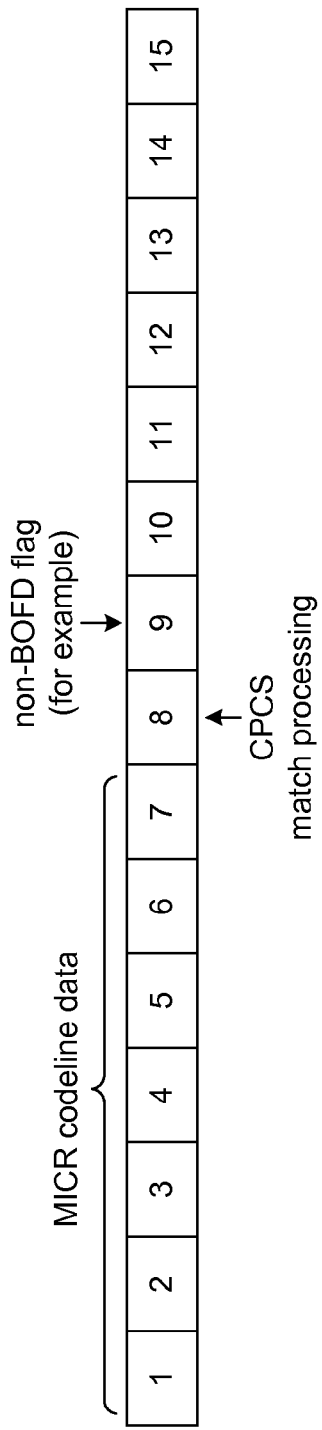
FIG. 3 is an illustrative representation of the structure of microdata associated with an electronic financial item.

For example, for each paper financial item, the generated data set may be formatted as shown in FIG. 3. The data set may have a plurality of fields (in this example, fifteen fields). The MICR codeline data may be stored in a subset of the fields. In this example, the MICR codeline data is stored in the first seven of the fields (i.e., fields one through seven as shown in FIG. 3). In addition, one or more of the fields may be set aside for use by a software application, such as the commonly-used IBM Check Processing Control System (CPCS), which operates in a mainframe computer operating system environment. In this example, field 8 is used for CPCS match processing. The various data sets may be generated at, for example, scanner 102 and/or controller 101 and stored together at, for instance, a database in mass storage 103.

Also, referring again to FIG. 2, in step 203, a flag may be applied to the data sets of those financial items that are non-BOFD items, but not to the data sets of those financial items that are BOFD items, or vice-versa. To accomplish this, each paper financial item may be manually or automatically identified as either a BOFD item or a non-BOFD item before, during, or after capture. For instance, prior to providing the paper financial items to scanner 201, the BOFD and non-BOFD items may already be pre-separated. Thus, a set of BOFD paper financial items may be easily captured separately from a set of non-BOFD paper financial items. The user of system 100 may thus inform scanner 102 and/or controller 101 of the BOFD status of various paper financial items being scanned. In response to being informed of the BOFD status of a given paper financial item being scanned, scanner 102 and/or controller 101 may either add a flag to the data set for that item or not add the flag, depending upon whether that item is a BOFD item or a non-BOFD item.

For example, where a flag is set, the flag may be included in any of the fields of the data set as shown in FIG. 3, such as any one or more of fields nine, ten, eleven, twelve, thirteen, fourteen, or fifteen. It may alternatively be desirable to add the flag to one of fields one through eight, however these fields may be used to store MICR codeline data and CPCS match processing data, as previously described. The flag may be a single bit (e.g., the highest or lowest order bit of the field) or a plurality of bits. The flag may be set, as shown in FIG. 3, where the associated financial item is a non-BOFD item but not when the associated financial item is a BOFD item. However, the opposite may be implemented.

Although the present example is discussed with regard to adding a flag to the data set, this is just one possibility. In general, a data set may be modified in step 203 in any manner desired depending upon whether the associated financial item is a BOFD item or a non-BOFD item. Alternatively, a data set may be modified in a first manner (e.g., a first flag) where the associated financial item is a BOFD item, and in a second manner (e.g., a different second flag) where the associated financial item is a non-BOFD item. The point is that the data set may include an indication as to whether the associated financial item is a BOFD item or not.

Next, in steps 204 and 205, various standard processing techniques may be performed, such as repairing and/or re-scanning any rejected paper financial items (step 204) and/or performing documents review (step 205). For example, a paper financial item may have been mis-scanned, or may be ripped, etc. Steps 204 and 205 may be performed by controller 101.

Next, in step 206, the various financial items may be reconciled. In this step, the dollar amounts stored in the data sets for a batch of financial items are totaled and compared with the expected total dollar amount for the batch. Step 206 may be performed by controller 101.

Next, in step 207, controller 101 may select and pull one or more of the data sets from mass storage 103 for sending to one or more of the other financial institutions 108 via Image Exchange Send.

Upon pulling the selected data sets, controller 101 may check each data set to see whether it relates to a BOFD financial item or a non-BOFD financial item. For instance, controller 101 may recognize whether or not there is a non-BOFD flag at field nine. If the non-BOFD flag exists, then controller 101 may, in step 209, prepare data for that item for sending via Image Exchange Send including a Subsequent Endorsement Record (i.e., a 28 Record). If the non-BOFD flag does not exist, then by default controller 101 may, in step 209, prepare data for that financial item for sending via Image Exchange Send including a BOFD Endorsement Record (i.e., a 26 Record). Of course, if the flag is instead a BOFD flag (as opposed to a non-BOFD flag), then the opposite may be performed: the existence of the BOFD flag causes controller 101 to create a BOFD Endorsement Record, whereas the non-existence of the BOFD flag causes controller 101 to create a Subsequent Endorsement Record. In either case, controller 101 may provide the correct type of endorsement record for Image Exchange Send.

Thus, illustrative embodiments have been described that allow financial institutions to efficiently include the appropriate BOFD Endorsement Record or Subsequent Endorsement Record for items sent via Image Exchange Send. These embodiments may prove more and more valuable as the handling of substitute checks and other electronic financial items becomes widespread.

What is claimed is:

1. A method, comprising:
    receiving a plurality of paper financial items;
    scanning each of the paper financial items;
    for each paper financial item, generating a data set based on the scanning;
    for each data set, determining whether the associated paper financial item is a bank of first deposit (BOFD) item or a non-BOFD item;
    for each data set, modifying the data set depending upon whether the associated paper financial item is determined to be a BOFD item or a non-BOFD item;
    for each data set, generating either a Subsequent Endorsement Record or a BOFD Endorsement Record depending upon whether data set was modified; and
    for each data set, transmitting data based on the data set and including either the associated Subsequent Endorsement Record or BOFD Endorsement Record.

2. The method of claim 1, wherein generating comprises generating the data sets to each comprise a plurality of fields including a subset of fields containing magnetic ink character recognition (MICR) data, and modifying comprises modifying data in one of the fields not containing the MICR data.

3. The method of claim 1, wherein modifying comprises setting a flag consisting of a single bit.

4. The method of claim 1, wherein modifying comprises modifying the data set in response to the associated paper financial item being determined to be a non-BOFD item.

5. The method of claim 1, wherein transmitting includes transmitting the data and the associated Subsequent Endorsement Record or BOFD Endorsement Record using Image Exchange Send.

6. The method of claim 1, wherein for each paper financial item, scanning includes reading magnetic ink from the paper financial item, and generating includes generating each data set based on a configuration of the magnetic ink.

7. The method of claim 1, further comprising storing the plurality of data sets together in a database.

8. The method of claim 1, wherein modifying comprises modifying the data set in response to the associated paper financial item being determined to be a BOFD item.

9. A method, comprising:
    receiving a plurality of paper financial items;
    scanning each of the paper financial items;
    for each paper financial item, generating a data set based on the scanning;
    for each data set, determining whether the associated paper financial item is a bank of first deposit (BOFD) item or a non-BOFD item;
    for each data set, modifying the data set in a manner that depends upon whether the associated paper financial item is determined to be a BOFD item or a non-BOFD item;
    for each data set, generating either a Subsequent Endorsement Record or a BOFD Endorsement Record depending upon the manner in which the data was modified; and
    for each data set, transmitting data based on the data set and including either the associated Subsequent Endorsement Record or BOFD Endorsement Record.

10. The method of claim 9, wherein generating comprises generating the data sets to each comprise a plurality of fields including a subset of fields containing magnetic ink character recognition (MICR) data, and modifying comprises modifying data in one of the fields not containing the MICR data.

11. The method of claim 9, wherein modifying comprises setting a flag consisting of a single bit.

12. The method of claim 9, wherein modifying comprises modifying the data set in response to the associated paper financial item being determined to be a non-BOFD item.

13. The method of claim 9, wherein modifying comprises modifying the data set in response to the associated paper financial item being determined to be a BOFD item.

14. The method of claim 9, wherein transmitting includes transmitting the data and the associated Subsequent Endorsement Record or BOFD Endorsement Record using Image Exchange Send.

15. The method of claim 9, wherein for each paper financial item, scanning includes reading magnetic ink from the paper financial item, and generating includes generating each data set based on a configuration of the magnetic ink.

16. The method of claim 9, further comprising storing the plurality of data sets together in a database.

17. A non-transitory computer-readable storage medium storing computer-executable instructions that, when executed by a computer, perform a method comprising:
   for each of a plurality of scanned paper financial items, generating data set based on data generated by the scanning;
   for each data set, determining whether the associated paper financial item is a bank of first deposit (BOFD) item or a non-BOFD item;
   for each data set, modifying the data set in a manner that depends upon whether the associated paper financial item is determined to be a BOFD item or a non-BOFD item; and
   for each data set, generating either a Subsequent Endorsement Record or a BOFD Endorsement Record depending upon the manner in which the data was modified.

18. The non-transitory computer-readable storage medium of claim 17, wherein the method further comprises, for each data set, transmitting data based on the data set and including either the associated Subsequent Endorsement Record or BOFD Endorsement Record.

19. The non-transitory computer-readable storage medium of claim 17, wherein generating comprises generating the data sets to each comprise a plurality of fields including a subset of fields containing magnetic ink character recognition (MICR) data, and modifying comprises modifying data in one of the fields not containing the MICR data.

\* \* \* \* \*